Dec. 4, 1928.

W. G. HERD 1,693,922

LUGGAGE CARRIER FOR AUTOMOBILES

Filed April 4, 1927

Mary Stewart
Mary Hawkins

Inventor
William Gordon Herd.

Patented Dec. 4, 1928.

1,693,922

UNITED STATES PATENT OFFICE.

WILLIAM GORDON HERD, OF DRUMHELLER, ALBERTA, CANADA.

LUGGAGE CARRIER FOR AUTOMOBILES.

Application filed April 4, 1927, Serial No. 180,921, and in Canada December 14, 1926.

My invention relates to improvements in automobile luggage carriers, in which the receptacle for the luggage is collapsible when empty; and the objects of my improvements are, first, to provide a luggage carrier of large holding capacity and of simple structure; second, to provide means for collapsing the luggage carrier when same is empty; third, to provide means for attaching the said carrier to an automobile, and fourth, to provide a means for mounting a spare tire on the luggage carrier.

I attain these objects by the mechanism illustrated in the accompanying drawing, in which—

Similar numerals refer to similar parts throughout the several views.

Figure 1:
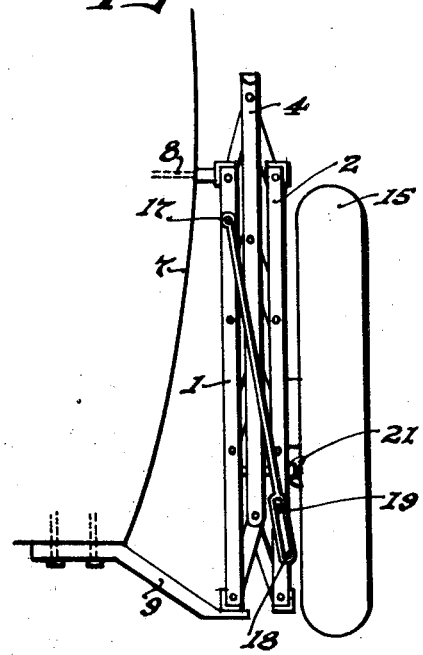
Fig. 1 is a side elevation of the luggage carrier in its collapsed state with a spare tire mounted thereon.
Figure 2:
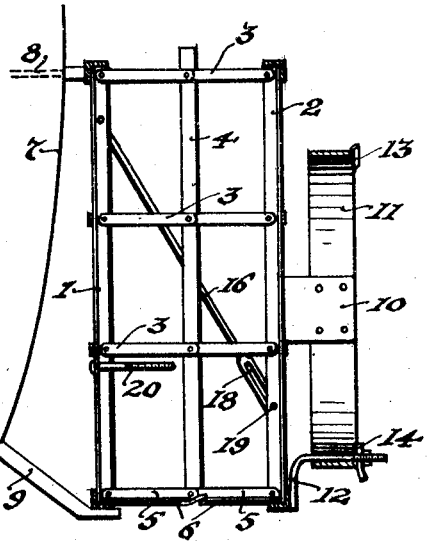
Fig. 2 is a cross section through the device looking in the same direction as Fig. 1 but expanded to form a receptacle for luggage. The spare tire is removed from its carrying rim.
Figure 3:
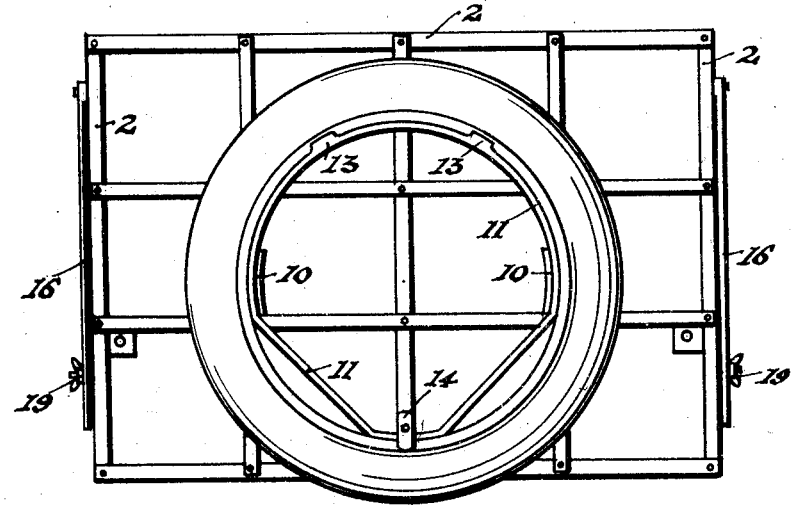
Fig. 3 is a complete rear elevation of the device.

The luggage carrier consists of a rectangular box shaped receptacle the sides being formed of spars or lattice work. The side 1 which is placed next the automobile is similar in every respect to the side 2. Side 1 is attached to the rear of automobile by bolts 8 the lower edge being supported by the brackets 9 which are bolted preferably to the chassis of the automobile. These brackets 9 will vary in design to suit the type of automobile to which the device is attached. The side of the luggage carrier 1 is therefore held rigidly in relation to the automobile. The side 2 is held in adjustable relationship to the side 1 by the pivotal links 3 and the mid-strap 4. One end of each link 3 is pivotally engaged with the sides 1 and 2 the other ends of links 3 being pivotally engaged with the mid-strap 4. Links 5 forming the bottom of the receptacle are preferably made of angle iron to which links are securely fastened the plates 6 which plates are lapped at their meeting edges. The plates 6 form a solid bottom to the receptacle when same is open.

Diagonal braces 16 are pivotally supported to the side 1 at 17 and have the lower ends slotted at 18. The studs 19 mounted on the side 2 pass through the slots 18 which studs have adjusting thumb nuts 19 for binding the diagonal braces 16 as required. Brackets 10 and 12 secured to the side 2 carry a light metal rim 11 adapted to carry a spare tire. The lugs 13 formed on member 11 hold the tire 15 at the top and a removable lug 14 secured by a nut holds the tire 15 at the bottom.

When the device is in its collapsed position it is held in that position by the bolts 20 secured to side 1 and which pass through suitable plates or holes in the side 2 binding pressure being applied to hold the sides together by the thumb nuts 21.

In use the device is securely attached usually to the rear of an automobile the side 1 being then immovable. Thumb nuts 21 being removed the luggage carrier can be expanded into a box like shape by simply pulling outwards on the side 2. The brace nuts 19 are then tightened up to make the whole device rigid. To close the device the mid-straps 4 are pulled upwards at the same time as side 2 is pressed towards the side 1. The thumb nuts 21 can then be screwed up to bind the whole together.

What I claim:

1. The combination in an automobile luggage carrier of a box shaped receptacle comprising one side in fixed relation to the automobile, a side in adjustable relation to the fixed side, pivoted links mounted on the said fixed and adjustable sides their other ends meeting in pivotal mountings on a mid-strap and combining with the mid-strap to form ends and bottom of the receptacle when open, a rim secured to the moving side adapted to carry an automobile tire.

2. The combination in an automobile luggage carrier of a box shaped receptacle comprising one side in fixed relation to the automobile, a side in adjustable relation to the fixed side, pivoted links mounted on the said fixed and adjustable sides their other ends meeting in pivotal mountings on a mid-strap and combining with the mid-strap to form ends and bottom of the receptacle when open, a rim secured to the moving side adapted to carry an automobile tire, means for securing the receptacle in its collapsed position comprising bolt members passing through the fixed and moving sides with binding nuts thereon; diagonal braces between the fixed and moving sides adjustably secured, all as set forth and for the purpose specified.

WILLIAM GORDON HERD.